(12) United States Patent
Jaaskelainen et al.

(10) Patent No.: US 9,359,833 B2
(45) Date of Patent: Jun. 7, 2016

(54) METHOD FOR INSTALLING MULTIPLE FIBER OPTIC CABLES IN COILED TUBING

(71) Applicant: Halliburton Energy Services, Houston, TX (US)

(72) Inventors: Mikko Jaaskelainen, Katy, TX (US); Kenneth Glenn Dixson, Houston, TX (US); Brian Vandelyn Park, Austin, TX (US); Maximo Gustavo Michaelis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 354 days.

(21) Appl. No.: 13/771,332

(22) Filed: Feb. 20, 2013

(65) Prior Publication Data
US 2014/0230232 A1    Aug. 21, 2014

(51) Int. Cl.
*G01R 3/00* (2006.01)
*E21B 17/20* (2006.01)
*E21B 47/01* (2012.01)
*E21B 47/06* (2012.01)
*G02B 6/50* (2006.01)

(52) U.S. Cl.
CPC ............... *E21B 17/206* (2013.01); *E21B 47/01* (2013.01); *E21B 47/06* (2013.01); *G02B 6/50* (2013.01); *Y10T 29/49002* (2015.01); *Y10T 29/5313* (2015.01)

(58) Field of Classification Search
CPC .. Y10T 29/49002; H01G 7/023; E21B 47/00; E21B 23/08; E21B 23/14
USPC ........ 29/592.1; 166/250.01, 250.02, 383, 385
See application file for complete search history.

(56) References Cited

U.S. PATENT DOCUMENTS

| | | | | |
|---|---|---|---|---|
| 5,429,194 A * | 7/1995 | Nice | | 166/383 |
| 6,116,085 A * | 9/2000 | Moffatt et al. | | 73/152.46 |
| 6,328,283 B1 * | 12/2001 | Reeve et al. | | 254/134.4 |
| 6,581,454 B1 * | 6/2003 | Smith | | 73/152.54 |
| 6,675,892 B2 * | 1/2004 | Kuchuk et al. | | 166/250.02 |
| 7,140,435 B2 * | 11/2006 | Defretin et al. | | 166/255.1 |
| 7,747,388 B2 * | 6/2010 | Mombourquette et al. | | 702/11 |
| 7,748,466 B2 * | 7/2010 | Aivalis et al. | | 166/383 |
| 7,845,419 B2 * | 12/2010 | Naumann | | 166/380 |
| 8,074,713 B2 * | 12/2011 | Ramos et al. | | 166/255.1 |
| 8,146,656 B2 * | 4/2012 | Brown | | 166/250.01 |
| 2005/0034857 A1* | 2/2005 | Defretin et al. | | 166/250.01 |
| 2006/0153508 A1* | 7/2006 | Bowker et al. | | 385/100 |
| 2010/0096124 A1* | 4/2010 | Naumann | | 166/250.01 |
| 2011/0073210 A1 | 3/2011 | Stretch et al. | | |
| 2015/0027690 A1* | 1/2015 | Aman et al. | | 166/250.01 |

\* cited by examiner

*Primary Examiner* — Paul D Kim
(74) *Attorney, Agent, or Firm* — Michael A. Ervin; Krueger Iselin LLP

(57) ABSTRACT

A method for installing multiple fiber optic cables in coiled tubing in oil and gas operations.

13 Claims, 7 Drawing Sheets

METHOD FOR INSTALLING MULTIPLE FIBER OPTIC CABLES IN COILED TUBING

CROSS-REFERENCE TO RELATED APPLICATIONS

Not applicable.

BACKGROUND

Coiled tubing systems are well known in the oil and gas industry. The term normally connotes a relatively small diameter continuous tubing string that can be transported to a well site on a drum or in a reel. Methods for inserting coiled tubing systems into existing wells are well known in the art. As oil and gas exploration technology continues to improve the demand for better wellbore information grows and there has been more interest in using coiled tubing to deploy more instrumentation into the wellbore, particularly pressure and temperature sensors.

As fiber optic telemetry develops there is increased need to install multiple fiber optic sensors inside coiled tubing. Each sensor may require its own FIMT (fiber in metal tubing), so there needs to be a method and devices to enable multiple FIMTs to be installed simultaneously in lengths of coiled tubing that can vary up to 10 km.

U.S. Pat. No. 6,116,085 to Moffatt describes a manufacturing method for inserting bundles of instrumentation, including thermocouples and pressure sensor wiring, in a coiled tubing system to create a continuous tubing string housing a plurality of pressure sensor assemblies connected to ports along the string and a plurality of thermocouples operative to measure temperatures along the string.

While some of these prior art methods provide workable solutions to the problem of installing sensor assemblies into coiled tubing there is a need for improved production techniques that do not require extensive cutting and welding steps in order to produce the coiled tube sensor assemblies. This need is growing as longer horizontal runs of tubing requiring more strength are being used.

DETAILED DESCRIPTION

Figure 1:
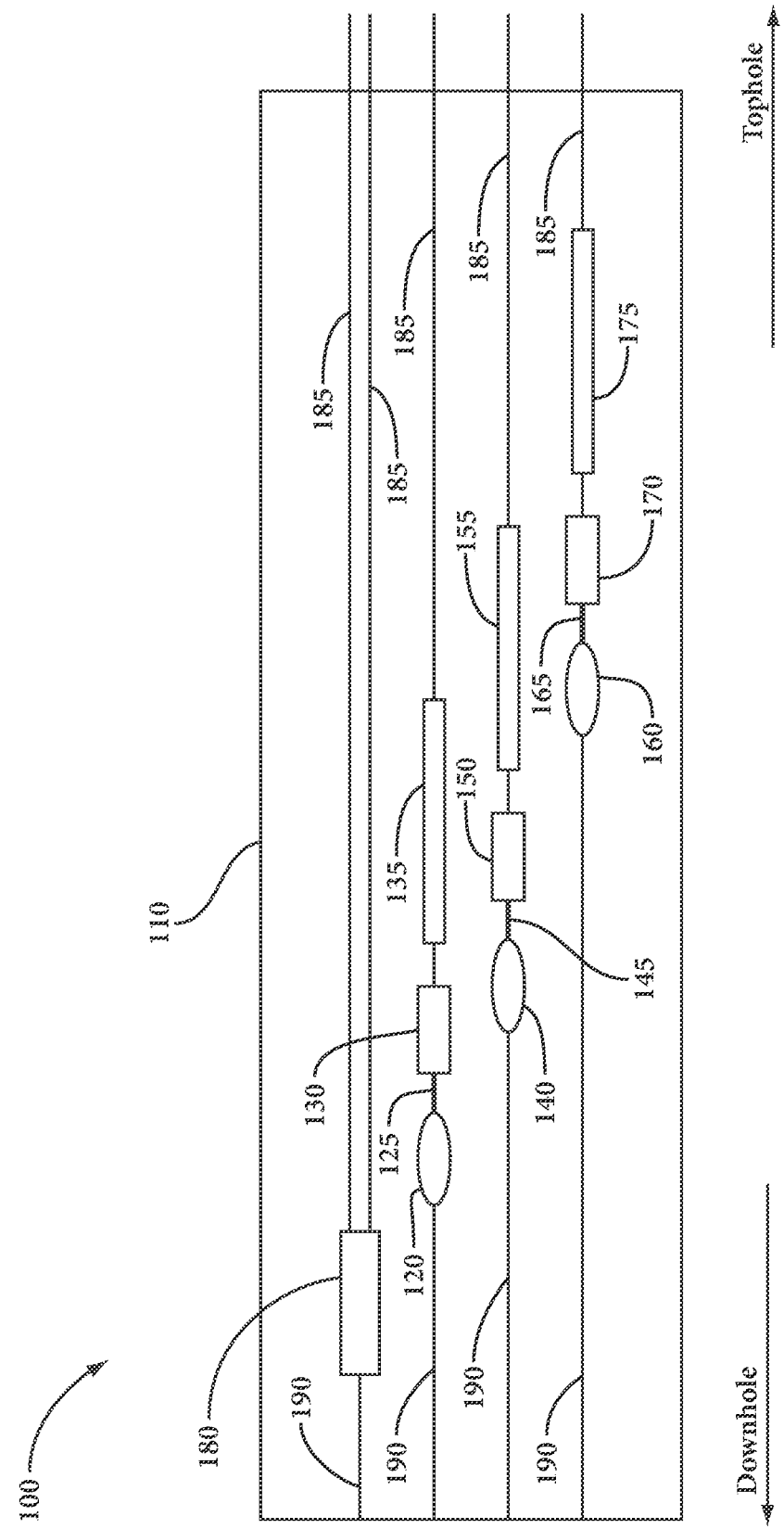
FIG. 1 illustrates a first embodiment or configuration of multiple fiber optic sensors in metal tubing (FIMT's) deployed in coiled tubing.

In the following detailed description, reference is made that illustrate embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken in a limited sense, and the scope of the disclosure is defined only by the appended claims.

The method and device to be described herein can be used for installing various and multiple types of sensors into a coiled tubing system to be used down hole in oil and gas operations. Example sensor systems may include multiple fiber optic and/or vibrating wire and/or conventional tubing encapsulated conductor (TEC) lines and pressure transducers. Other types of sensor commonly found in logging operations including but not limited to Distributed Temperature Sensing (DTS), Distributed Acoustic Sensing (DAS), single point acoustic sensors, resistivity measuring devices, radiation measuring devices, chemical sensors etc. are also possible.

A typical fiber telemetry system inside coiled tubing can consist of three fiber optic pressure transducers, one at the heel, one at the toe and one in the middle of the horizontal portion, along with additional fiber for DTS or DAS telemetry. Each sensor may have single or multiple fibers, which are normally run inside FIMTs. Thus as many as 5 or more FIMTs may have to be installed in the coiled tubing at the same time. Although the number can vary the examples given in this disclosure will demonstrate the deployment of three fiber optic pressure transducers, one at the heel, one at the toe and one in the middle of the horizontal portion, along with additional fiber for DTS or DAS telemetry.

The sensors, comprising e.g., fiber optic, vibrating wire or TEC (Tubing Encapsulated Conductor) cables, chemical sensors, electromagnetic sensors, pressure sensors and pressure block housing can be pulled and/or pumped into the coiled tubing. The sensing string can also include various electrical sensors, including point thermocouples for temperature sensing as well as DTS system calibration. The DTS and or DAS fibers can be deployed inside a FIMT along with the pressure sensors, or pumped into a conduit after installation. The fiber for the DTS can be pumped into a double-ended conduit for some coiled tubing deployments. The location of the pressure transducers, e.g. pressure sensor and pressure block housing are carefully measured before they are pulled into the coiled tubing. The exact location can then be identified using e.g. x-ray systems and/or ultrasonic systems and/or DAS systems by tapping on the coiled tubing and/or by DTS systems and apply a thermal event or other similar methods where distance can be verified and compared with distances measured before the sensing string is pulled into the coiled tubing. Penetrations can then be drilled though the coiled tubing at suitable locations, and suitable seals can be applied to/activated on the assembly. All of the installation of the sensor systems into the tubing is done in the coiled tubing before the tubing is deployed downhole.

FIG. 1, represented by the numeral 100, illustrates one approach for dealing with the multiple installations described above. A coiled tubing 110 is shown in a cross sectional view to expose the inner installation. The illustration is a horizontal tubing run—the heel portion is nearest to the top hole, the toe portion closest to the down hole. Three pressure transducers, each consisting of a pressure housing linked to a pressure sensor via a pressure line, and a splice housing are shown. Pressure housing 120, pressure line 125, pressure sensor 130, and splice housing 135, are to be deployed in the toe portion of the tubing. Pressure housing 140, pressure line 145, pressure sensor 150, and splice housing 155, are to be deployed in the middle portion, and pressure housing 160, pressure line 165, pressure sensor 170, and splice housing 175, are to be deployed in the heel portion.

A turnaround housing 180, to be installed at the toe portion, is used for deployment of Distributed Temperature or Distributed Acoustic sensor fibers that are fed from the top hole to the downhole and back to the surface.

Each of these sensors may require a FIMT (fiber in metal tubing) run. Five of these 185 are shown. In this example each of the three pressure transducer systems and the turnaround housing has pull cables 190 attached on the downhole ends to enable pulling the systems through during initial installation. In this approach each FIMT is pulled by a separate pull cable in the downhole direction and each gauge has its own FIMT. There is one splice per gauge and one fiber per FIMT.

The remaining embodiments to be shown involve a different approach that is disclosed herein. In these a simpler pull assembly can be used in the tophole direction.

Figure 2:
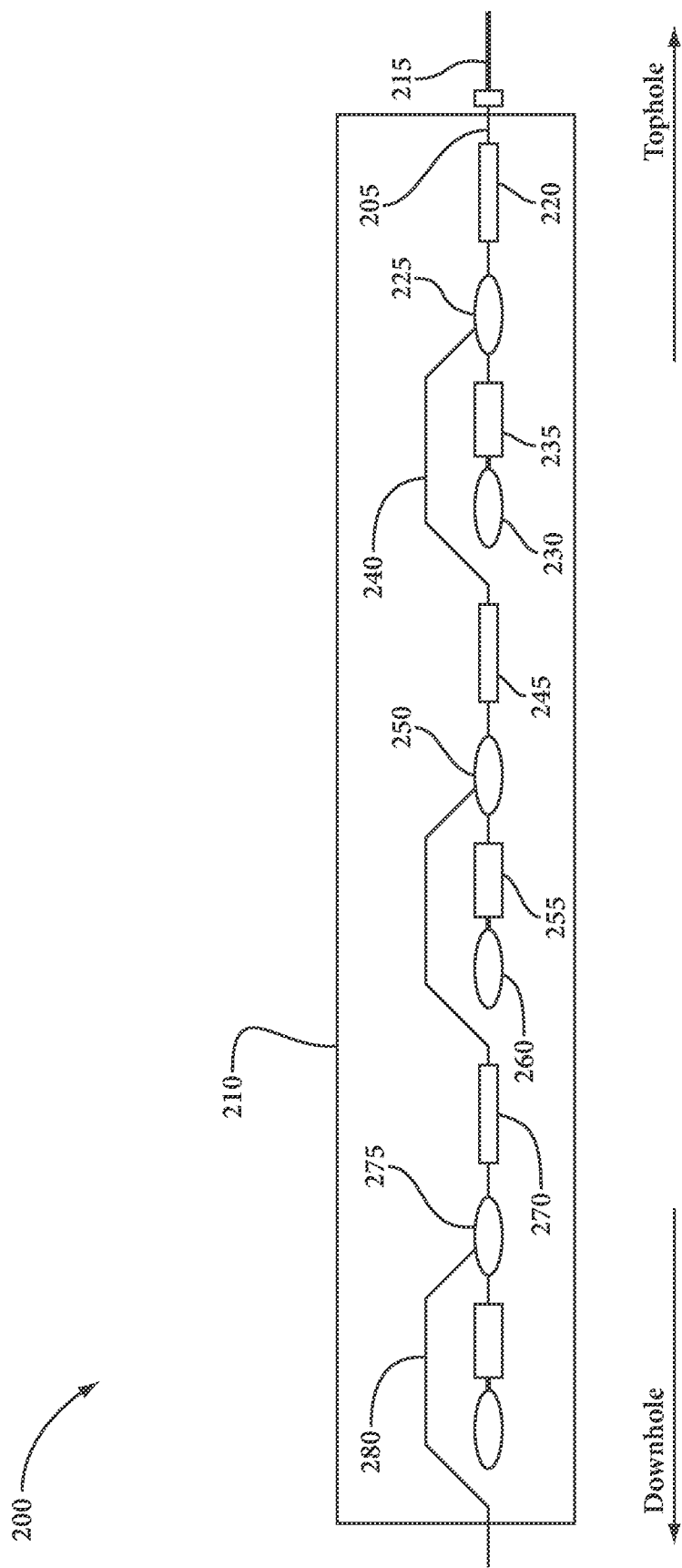
FIG. 2 illustrates a second embodiment of multiple fiber optic sensors in metal tubing (FIMT's) deployed in coiled tubing.

FIG. 2, represented by the numeral 200, illustrates an alternative embodiment making use of a different configuration and making use of an uphole pulling arrangement at the heel end. Again the coiled tubing 210 is shown in cross section to expose the inner configurations. In this embodiment the DTS or DAS sensor is not shown but would be further downhole at the toe end. A single FIMT 205 and single pull cable 215 are used. The first splice housing 220 brings in all of the optical or electrical connectors to a first FIMT splitter 225. The first pressure transducer system at the heel end, comprising pressure housing 230 and pressure sensor 235 is split out at the heel and the FIMTs 240 continue down the coiled tubing toward the toe. At the middle section another splice housing 245 and FIMT splitter 250 are used to split out another pressure transducer system 255, 260 and the FIMT's 265 continue down the coiled tubing to eventually feed into a third splice housing 270 and FIMT splitter 275 that deploys the toe pressure transducer system and further feeds fiber downstream to the DTS or DAS sensor at the downhole position. This configuration offers simplicity from that of FIG. 1 in that only one pull cable and one FIMT is fed from the tophole end. It is somewhat easier to assemble and pull. It suffers somewhat from the FIG. 1 configuration in that it results in a non-retrievable DTS or DAS FIMT.

Figure 3:
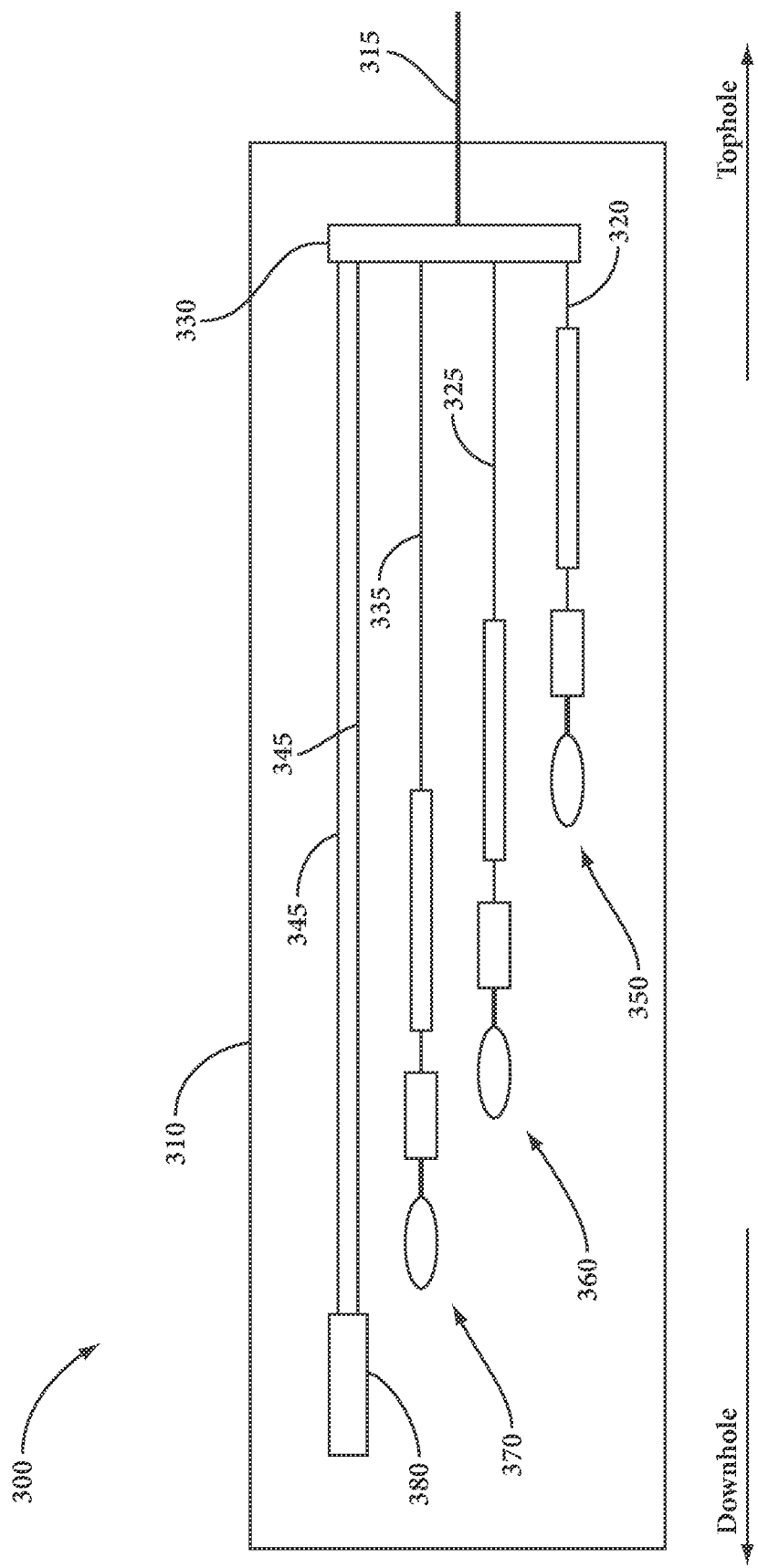
FIG. 3 illustrates a third embodiment of multiple fiber optic sensors in metal tubing (FIMT's) deployed in coiled tubing.

The embodiment of FIG. 3, represented by the numeral 300, although somewhat more complicated than that of FIG. 2, addresses some concerns. This configuration, within coiled tube 310 also involves only a single pull cable 315, connected to an FIMT splitter 330 but offers individual FIMTs for each gauge and thus offers a retrievable DTS fiber. The three pressure transducer systems 350, 360, and 370 each have their own FIMTs 320, 325, 335 and the DTS turnaround housing 380 at the downhole end has its own FIMTs 345.

Figure 4:
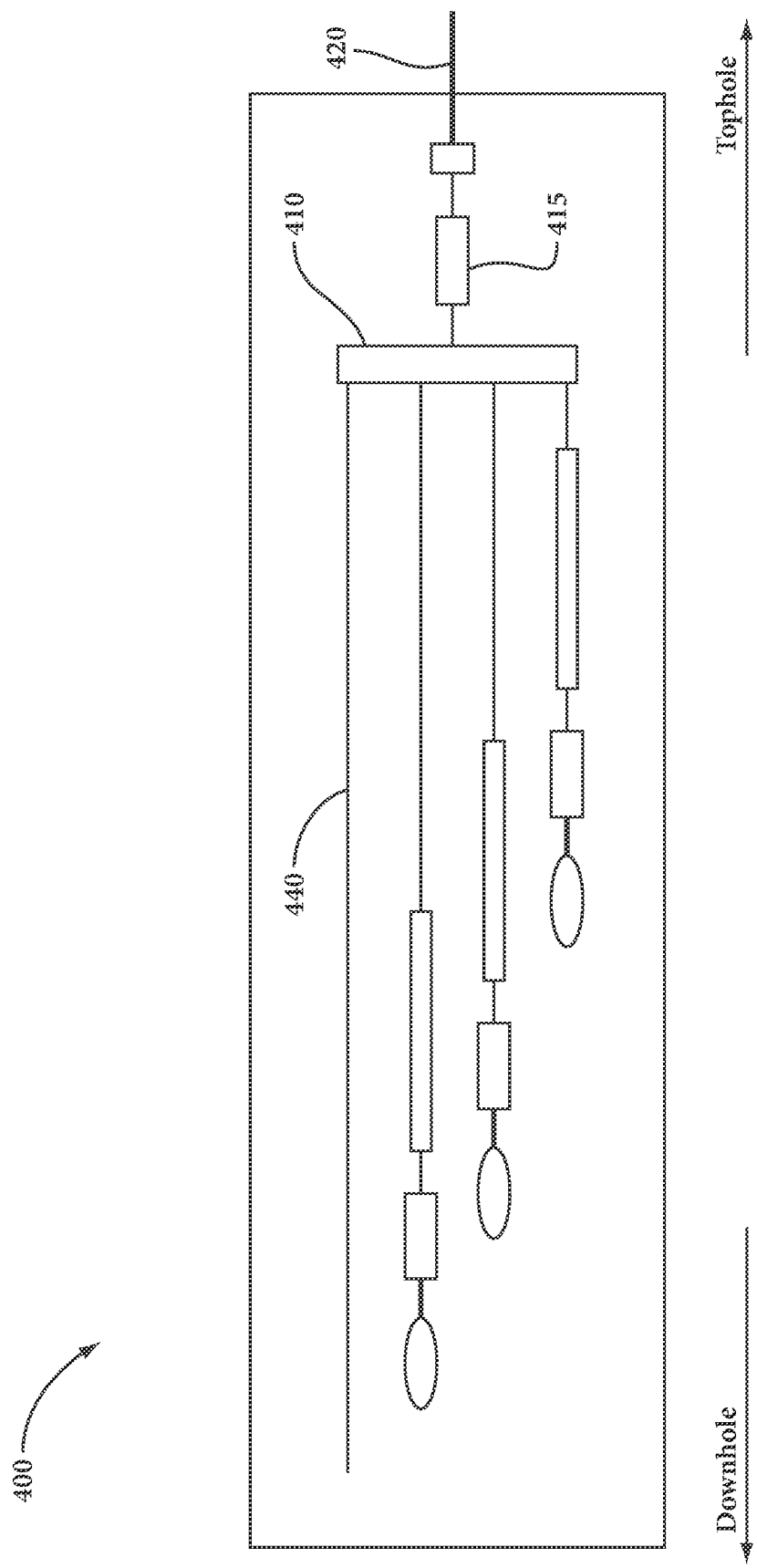
FIG. 4 illustrates a fourth embodiment of multiple fiber optic sensors in metal tubing (FIMT's) deployed in coiled tubing.

In another configuration FIG. 4, represented by the numeral 400, illustrates an approach of using one FIMT splitter 410 (and splice housing 415) with one pull cable 420. Splitter 410 splits into four FIMTs, serving three pressure transducers at the heel, middle, and toe as well as FIMT's 440 feeding downhole to a DTS system (not shown).

Figure 5:
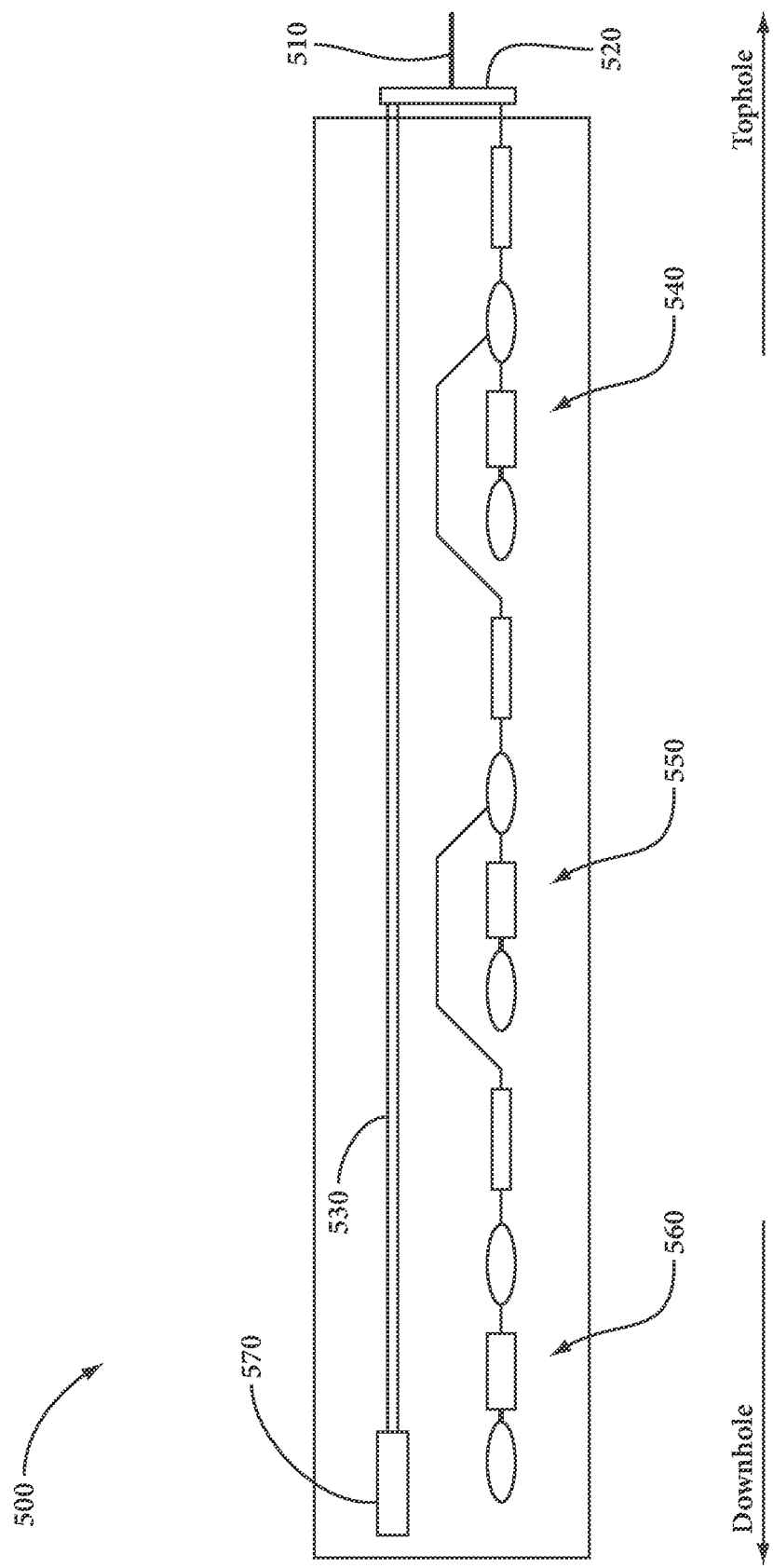
FIG. 5 illustrates a fifth embodiment of multiple fiber optic sensors in metal tubing (FIMT's) deployed in coiled tubing.

FIG. 5 illustrates another configuration of intermediate complexity. This embodiment features a single pull cable (top hole) 510, one splitter 520, resulting in a separate and retrievable DTS fiber via a dedicated DTS FIMT 530, shown connected to a downhole turnaround stub, and one pressure FIMT transducer train with 3 pressure transducers deployed at the heel 540, middle 550, and toe 560. This results in a single tophole pull cable, no significant load on the pressure gauges, and a retrievable DTS system.

Figure 6:
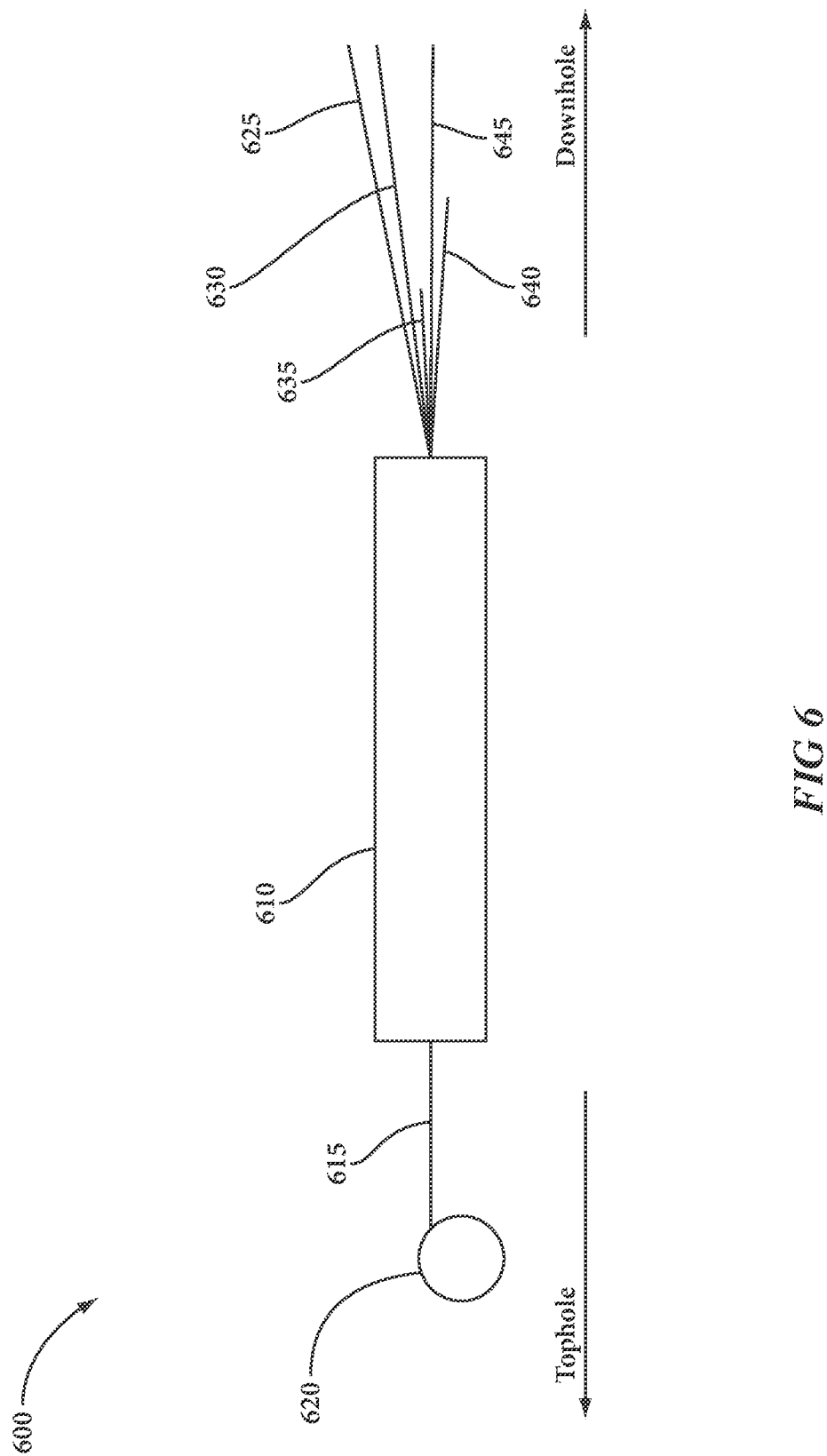
FIG. 6 illustrates a methodology for the installation of multiple fiber optic sensors in metal tubing (FIMT's) deployed in coiled tubing.

Each of the embodiments and devices illustrated in FIGS. 2,3,4, and 5 can then be installed using the following process with reference to FIG. 6.

The unrolled coiled tubing 610 is laid out parallel to the ground with the pull cable 615 from the pull cable winch 620 deployed within the coiled tubing. The winch 620 is positioned at the tophole end. The various FIMTs 625, 630, 635, 640, and 645 are laid out with their correct spacing at the downhole end. FIMTs 625 and 630 may be connected to the DTS system or DAS systems. FIMT 635 is connected to the heel (tophole) pressure transducer. FIMT 645 is connected to the toe (downhole) pressure transducer. FIMT 640 is connected to the middle pressure transducer. The FIMTs are then connected to the pull cable and pulled through the coiled tubing.

As the pressure housings enter the tubing, the FIMTs that are deployed further downhole than the various pressure housings, are positioned so that they fit into bypass groves (not shown) on the exterior of the pressure housings.

Each of the pressure housings may have a magnet inside the housing to help locate the housing within the tubing by means of a magnetometer or other means like e.g. x-ray. Holes are then drilled through the coiled tubing to permanently fix the pressure housings in place using techniques such as for example drilling holes through the tubing walls and welding or applying installation screws. Holes are also drilled through the coiled tubing to access pressure ports on each pressure housing.

Once completed ports on the pressure housings are pressure tested via the pressure ports while the entire assembly is still above ground. After successful pressure testing the coiled tubing is rewound on its spool for shipping to the well site for installation.

Figure 7:
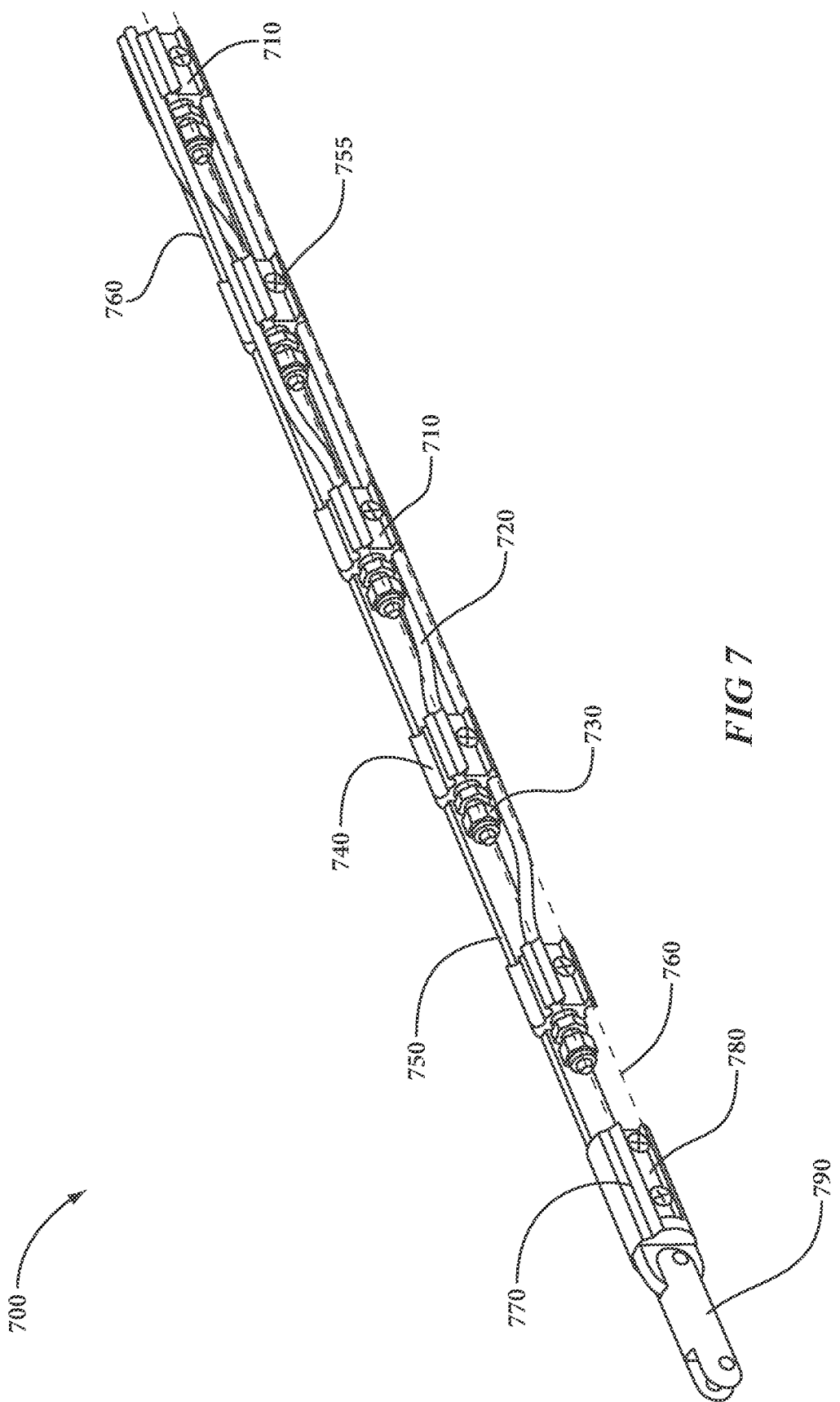
FIG. 7 illustrates a multiple FIMT puller assembly for pulling a configuration of FIMT's into the coiled tubing.

The connection of the various FIMTs to the pull cable can be accomplished by the use of a multiple FIMT puller assembly, shown in FIG. 7. The overall assembly 700 is made up with a series of puller housings 710, one for each FIMT, with the puller housings aligned in a row by being mounted to two pulling braces 750 and 760, the pulling braces positioned on opposite sides of the puller housings. Each FIMT 720 is connected and retained in a puller housing a compression fitting such as a Swagelok compression fitting. As each FIMT is installed in the puller assembly it is bent to fit around the higher puller housings and fitted into bypass grooves 740 in the puller housings. The mounting of the puller housings to the pulling braces can be done with screws 755. The nearside pulling brace 760 is shown as transparent in the drawing to allow clarity. A front puller 780 is added to the front end of the pulling braces and a swivel 790 is then attached to the front puller. The assembly is done is such a way that the weld bead grooves 770 on the puller and on each puller housing are all aligned.

The assembly is then fastened to the pulling cable previously installed in the coiled tubing, and the complete assembly with FIMTs is pulled into the coiled tubing. The weld bead grooves 770 are aligned with the weld seam inside the tubing (not shown), which acts as a guide along its full length.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method for installing multiple pressure transducers, and other downhole sensor systems at desired locations in unrolled coiled tubing, comprising:
    laying unrolled coiled tubing out parallel to the ground;
    extending a pull cable attached to a pull cable winch through the unrolled coiled tubing from a heel (tophole) end of the unrolled coiled tubing to a toe (downhole) end of the unrolled coiled tubing;
    mounting each of the to be deployed pressure transducers to the end of a FIMT (fiber in metal tubing); with each of the pressure transducer laid out with their correct spacing at the toe (downhole) end for the desired locations;
    positioning additional FIMTs for the other downhole sensor systems;
    connecting each of the FIMTs to the pull cable; and
    using the pull cable winch to pull the pull cable and each of the pressure transducer connected to the FIMT and the additional FIMTs into the unrolled coiled tubing, thus installing the multiple pressure transducers and other downhole sensor systems at the desired locations in the unrolled coiled tubing;
    wherein as each of the to be deployed pressure housings enters the coiled tubing the FIMTs and pull cable are positioned to fit into bypass grooves on the exterior of the pressure housings as the FIMTs and the pull cable pass into the unrolled coned tubing.

2. The method for installing multiple pressure transducers, and other downhole sensor systems in the unrolled coiled tubing of claim 1, further comprising: locating each of the pressure housings and drilling through the unrolled coiled tubing to permanently fix the pressure housings in place.

3. The method for installing multiple pressure transducers, and other downhole sensor systems in coiled tubing of claim 2 wherein permanently fixing the pressure housings in place is accomplished by welding.

4. The method for installing multiple pressure transducers, and other downhole sensor systems in coiled tubing of claim 2 wherein permanently fixing the pressure housings in place is accomplished by installation screws.

5. The method for installing multiple pressure transducers, and other downhole sensor systems in unrolled coiled tubing of claim 2, wherein at least one hole is drilled through the unrolled coiled tubing at each pressure housing location to access pressure ports on each pressure housing.

6. The method for installing multiple pressure transducers, and other downhole sensor systems in unrolled coiled tubing of claim 5, further comprising performing pressure tests on each pressure housing while the unrolled coiled tubing is still above the ground.

7. The method for installing multiple pressure transducers, and other downhole sensor systems in unrolled coiled tubing of claim 6, further comprising the step of rewinding the unrolled coiled tubing on a spool for shipping to a well site.

8. The method for installing multiple pressure transducers, and other downhole sensor systems in coiled tubing of claim 1 wherein the other downhole sensor systems comprise fiber optic and/or vibrating wire sensors.

9. The method for installing multiple pressure transducers, and other downhole sensor systems in coiled tubing of claim 1 wherein the other downhole sensor systems comprise chemical sensors.

10. The method for installing multiple pressure transducers, and other downhole sensor systems in coiled tubing of claim 1 wherein the other downhole sensor systems comprise electromagnetic sensors.

11. The method for installing multiple pressure transducers, and other downhole sensor systems in coiled tubing of claim 1 wherein the other downhole sensor systems comprise tubing encapsulated cable systems.

12. The method for installing multiple pressure transducers, and other downhole sensor systems in coiled tubing of claim 1 wherein the other downhole sensor systems comprise electrical sensors.

13. The method for installing multiple pressure transducers, and other downhole sensor systems in coiled tubing of claim 12 wherein the other electrical sensor systems comprise point thermocouples for temperature sensing or DTS calibration.

* * * * *